United States Patent [19]

McCabe

[11] 4,245,758
[45] Jan. 20, 1981

[54] METHOD AND APPARATUS FOR MEASURING MOLTEN METAL STREAM FLOW

[75] Inventor: Roger A. McCabe, Cecil, Ohio

[73] Assignee: Quantum Concepts Corporation, Inc., Cecil, Ohio

[21] Appl. No.: 47,981

[22] Filed: Jun. 13, 1979

[51] Int. Cl.[3] ............................................. B67D 5/08
[52] U.S. Cl. ....................................... 222/52; 222/71;
222/591; 364/509; 364/477; 364/564; 164/4;
356/379; 73/198
[58] Field of Search ..................... 222/52, 55, 59, 71,
222/591, 594, 596; 164/4; 356/379, 445;
364/509, 510, 564, 477; 73/198

[56] References Cited

U.S. PATENT DOCUMENTS

| | | | |
|---|---|---|---|
| 3,028,501 | 4/1962 | Lamparter | 356/179 |
| 3,537,505 | 11/1970 | Thalmann et al. | 164/4 |
| 3,588,480 | 6/1971 | Unger et al. | 364/564 |
| 4,090,241 | 5/1978 | Houston | 364/510 X |
| 4,145,914 | 3/1979 | Newman | 364/510 X |

*Primary Examiner*—Joseph J. Rolla
*Attorney, Agent, or Firm*—Richard T. Seeger

[57] ABSTRACT

A plurality of arcuately spaced transceivers for emitting and receiving radiation waves are positioned in a plane transverse to a molten metal stream. Each transceiver emits a radiation wave which is directed toward and reflected from the stream and the reflections are received by the transceivers. The time elapsed between the emitting and receiving of the radiated waves is measured for each transceiver. The time elapsed information is fed to a binary counter for each transceiver and the binary counts are averaged and processed in a computer to calculate the stream area. The rate of change in area of the stream in the transverse plane is determined, or alternatively the velocity is determined by measuring the time elapsed for a particular stream area to traverse a predetermined distance and fed to a computer which computes stream velocity. The velocity and area measurements of the stream are used to determine the stream volume. A programmed pour rate is then compared with the stream volume. A servo pour controller stream volume maintains the stream volume at the programmed rate. Pour rate digital displays and manual overrides to the pour controller are also provided.

11 Claims, 4 Drawing Figures

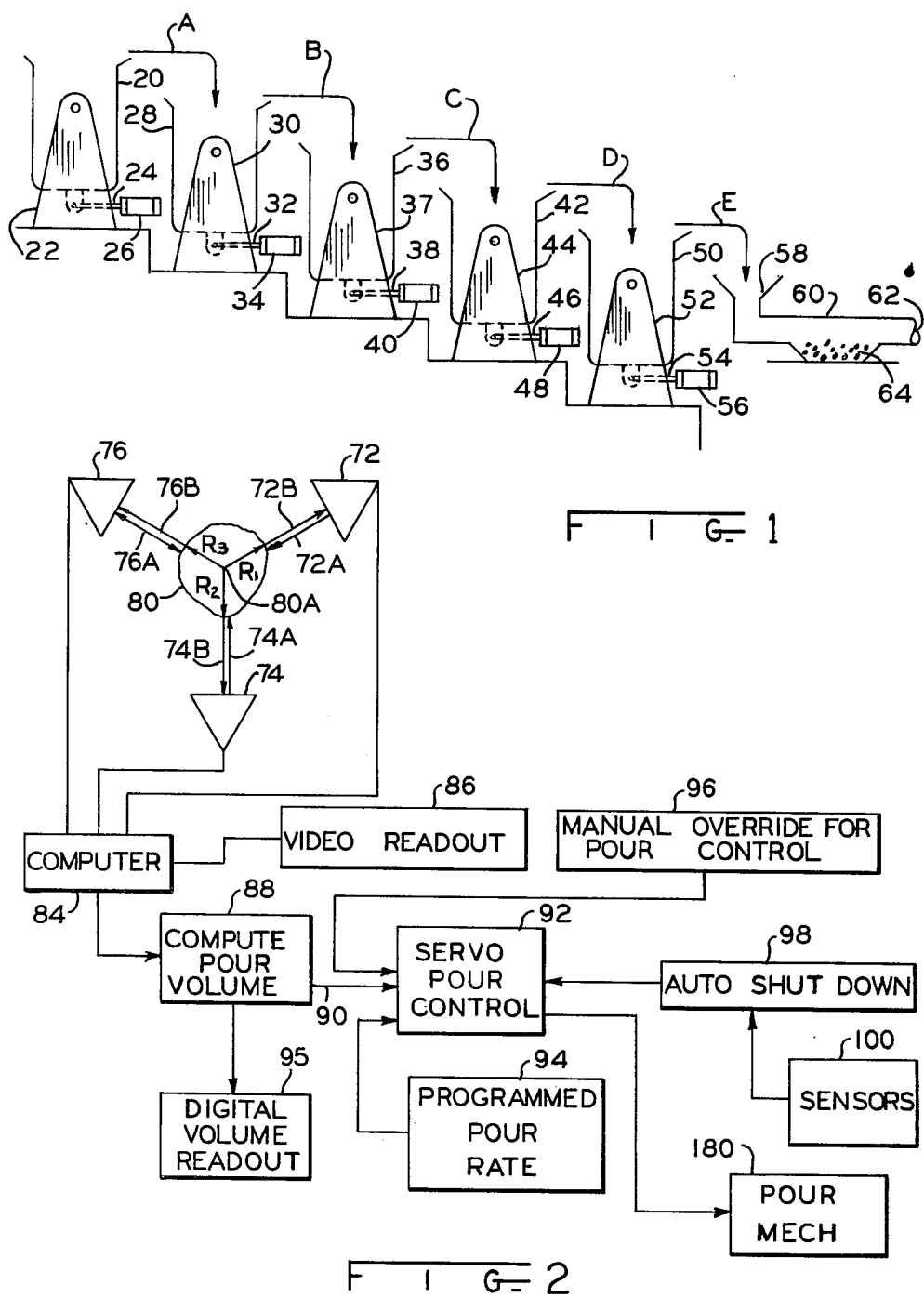

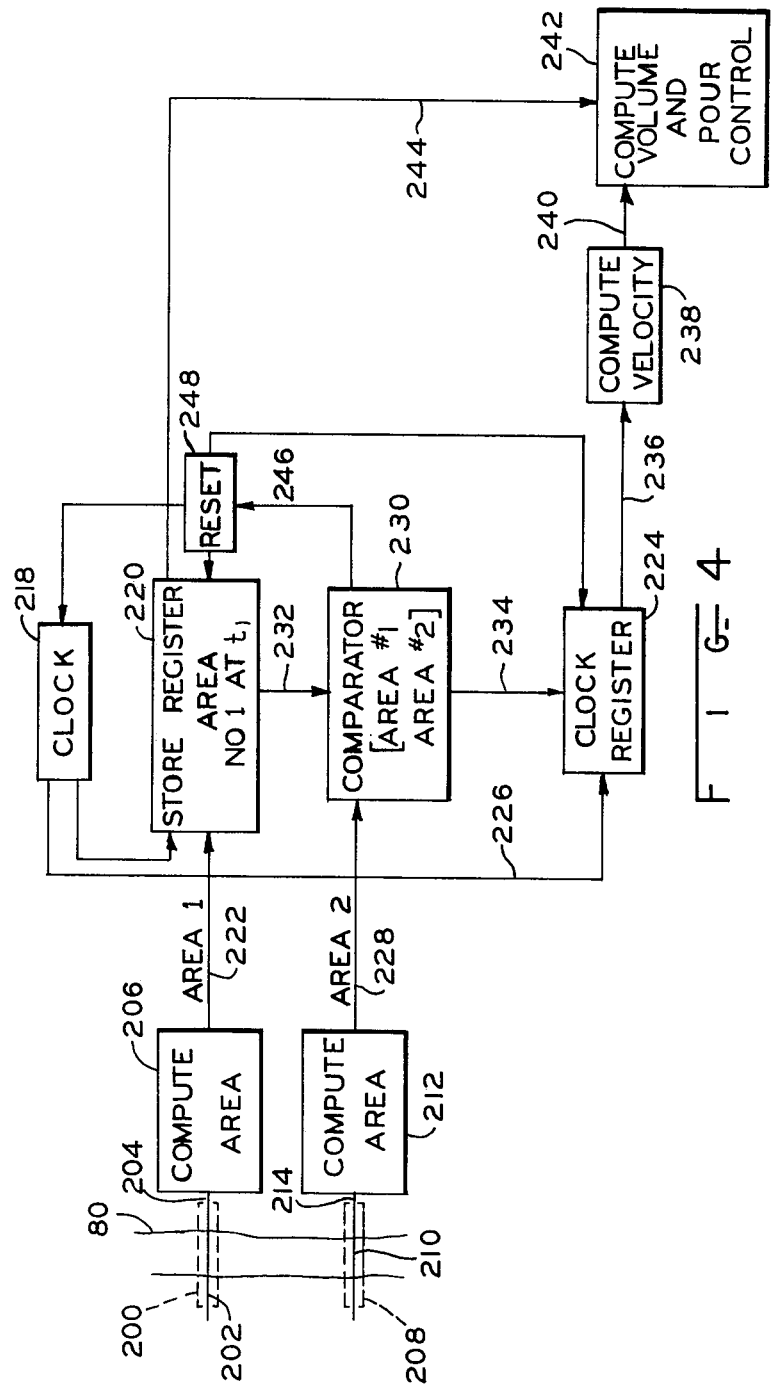

METHOD AND APPARATUS FOR MEASURING MOLTEN METAL STREAM FLOW

BACKGROUND OF THE INVENTION

1. Field of the Invention

This invention relates generally to the metal-forming arts, and more particularly to a system for measuring and controlling the flow of molten metal into a casting mold.

2. Description of the Prior Art

In the metal forming arts, it has long been an objective to control the flow rate of molten metal into a casting mold to provide in some instances a constant flow rate and in other instances a variable flow rate to properly fill the narrow and wide sections of the mold and to control the flow according to the mold shape. The flow rate has been controlled by providing a corresponding level of metal in the casting tundish, or by providing flow control devices in the pouring spout of the tundish. Frequently a holding furnace was provided between the melting furnace and the tundish to properly maintain and control the level in the tundish. The holding furnace has been automatically controlled to pour metal into the tundish at a rate to maintain the desired metal level therein. Flow rate control was particularly acute in continuous casting operations where an improper flow rate can reduce capacity, increase the number of unacceptable castings, and increase scrap rate due to surface imperfections, tears, pin holes, internal tears, and buttend scrap.

Other causes of high scrap rate are short pours, wherein insufficient metal is poured into the mold resulting in an incomplete molded part; long pours, wherein metal is wasted and difficulty in separating sand molds is experienced due to the excess metal solidifying on the mold exteriors; intermittent pours, wherein a "marble" effect occurs due to irregular cooling of the metal; and mold blow out wherein the mold walls are disrupted due to excessive pouring rates.

Numerous efforts have been made to measure the metal flow and control the pour. Such efforts are exemplified by the devices disclosed in the following U.S. Pat. Nos.:

3,478,808
3,528,479
3,537,505
3,838,730
3,842,894
3,875,989
3,884,288
3,942,577
3,961,662
4,014,379
4,030,531
4,050,503
4,077,457

These efforts have included irradiating the molten metal stream and measuring the affect of the stream on the radiation; flowing the stream through a magnetic field of the stream; and measuring the light emission of the stream with a photoelectric cell. All of these methods were inexact and only approximate. It was difficult, if not impossible, to obtain sufficiently accurate flow data to be useful in a pour-casting process. Further, many prior efforts have involved apparatus which is required to be relatively closely positioned to the flow stream for proper operation. This has the disadvantage of subjecting the apparatus to extremely high temperatures and also subjecting it to contact with the molten metal which in most cases would disable the measuring apparatus.

SUMMARY OF THE INVENTION

Three radio wave transceivers are positioned in a plane that is transverse to a molten metal stream flow and equally spaced from one another. The transceiver may also emit other forms of radiation such as sound and laser radiation. The transceivers are positioned along respective stream flow radii. A radio wave from each transceiver is directed towards the stream with the reflection of each radio wave being received by the respective transceiver. The time elapsed between the radio wave transmission and its reception by each transceiver is measured by a binary counter, the count being a measure of the stream radius of each respective transceiver. The radii measurements are then averaged and mathematically processed to compute the stream area in the transverse plane at closely spaced predetermined intervals of time. Further, the rate of change of the stream area between each interval of time is measured and processed by a computer to determine the stream velocity. This is possible since it is known that stream velocity is proportional to the stream ripples, or frequency of stream area change in any given transverse plane, and by comparing such changes in a known relation, the velocity is determined.

In an alternate embodiment, two stream area measurements are taken in substantially parallel transverse planes spaced apart a predetermined distance, and the area of the stream in the first plane at a time T1 is stored and presented to a comparator to which is fed the stream area in the second plane. When the areas from the first and second planes are exactly equal, the comparator emits a stop signal to a clock register which measures the time elapsed for a given area to pass between the first and second planes for determining stream velocity. Again, it is known that in a liquid stream, the velocity is proportional to stream ripples and the stream area is constantly changing, and further that a given area in the stream remains substantially unchanged as it moves downwardly in the stream so that measurement of the time elapsed for any given area moving between two transverse planes spaced apart a predetermined distance will determine stream velocity.

Once having the stream area and stream velocity, the stream volume is computed. The volume information is then fed to a servo pour controller which compares the actual pour volume with a programmed pour rate for the particular casting operation. The difference signal between the actual pour volume and the programmed pour rate is then fed to a pour control mechanism to vary the actual pour volume to agree with the programmed rate. A manual override is provided to the controller in the event that it is desired to change the pour rate for a particular operation or due to a condition which the programmed rate will not correct. Also, a digital display of the pour volume is provided. An automatic shut down override to the controller is provided upon the sensing of overflow or other malfunctions. The transceivers are sufficiently spaced from the molten metal stream so that they will not be damaged by excessive heat or contact with the stream.

Therefore, it is an object of this invention to provide a molten metal flow measurement apparatus that is highly accurate and reliable.

Another object of this invention is to provide in the apparatus of the previous object a plurality of radiation transceivers in the given transverse plane which are radially aligned with a predetermined stream center for measuring the respective radius of the stream on which they are aligned.

A further object of this invention is to provide in such a measurement apparatus a stream area measurement in a given transverse plane and a stream area change rate to provide stream velocity information from which stream volume is computed.

Another object of this invention is to provide in such a measurement apparatus stream area measurement at two spaced planes transverse to stream flow, and measuring the time elapsed for a given stream area to flow between the first and second planes to determine stream velocity.

A further object of this invention is to provide a servo pour controller for comparing the actual stream flow volume and a programmed pour rate to control the molten metal pour mechanism.

A further object of this invention is to provide in the apparatus of the previous objects automatic and manual overrides of the pour controller.

A further object of this invention is to provide a method of determining liquid stream volume flow by measuring instantaneous stream areas in spaced planes transverse to stream flow.

The above-mentioned and other features and objects of this invention and the manner of attaining then will become more apparent and the invention itself will be best understood by reference to the following description of an embodiment of the invention taken in conjunction with the accompanying drawings.

BRIEF DESCRIPTION OF THE DRAWINGS

FIG. 1 is a flow schematic diagram of a typical metal casting process;

FIG. 2 is a schematic block diagram for measuring and controlling a molten metal pour stream.

FIG. 4 is a schematic block diagram of an alternate embodiment for measuring and controlling a molten metal stream.

DESCRIPTION OF THE PREFERRED EMBODIMENT

Figure 3:
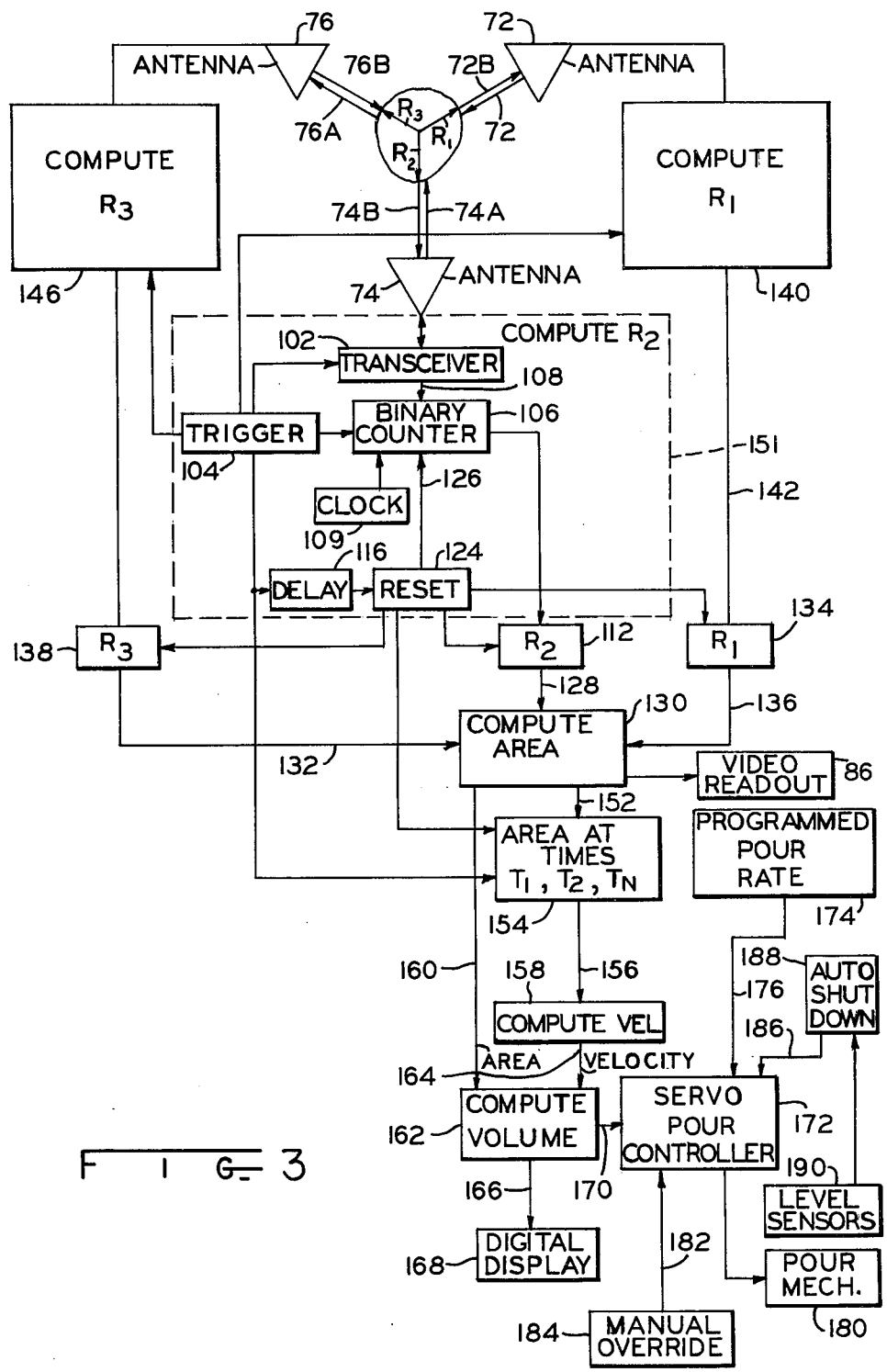
FIG. 3 is a schematic block diagram of the system of FIG. 2 illustrating in more detail one form of implementing the FIG. 2 system.

Referring to the drawings, FIG. 1, a cupola 20 which is tiltably mounted on stanchion 22 mounted to a base on either side of cupola 20, and fed with raw or pig iron at a rate such as 40 tons per hour, is heated by conventional heating means, not shown, until the metal is molten. Cupola 20 is then tilted, as by a power operated tilting rod 24, which is axially driven by a power member 26, and is poured into a treatment holding ladle 28, with the slag being removed by conventional methods during the pouring process. Ladle 28 is tiltably supported on stanchions 30 mounted to a base on either side thereof, where carbide and $CO_2$ are added to the melt. Ladle 28 is tilted, as by rod 32 which is axially driven by power member 34, causing the treated molten metal to be poured into an "ASEA" holding furnace 36. Furnace 36 is tiltably supported by stanchions 37, mounted to a base on either side thereof, and is tiltable by rod 38 axially driven by power member 40, to pour the molten metal into a hot metal crane 42 wherein, to every 5,000 pounds of metal, 150 pounds of punchings, 100 pounds of magnesium, and 5 pounds of silicon are added. Crane 42 is tiltably supported on stanchions 44, which are mounted on either side thereof, and tiltable by rod 46 which is axially driven by power member 48. Crane 42, when tilted, pours into ladle 50 wherein the desired alloys are added and the waste iron is slagged off the top. Ladle 50 is tiltably supported by stanchions 52 mounted to a base on either side thereof and desired alloys are added with the waste materials being slagged off the top in conventional fashion. Ladle 50 is tiltable by rod 54 axially driven by power member 56 to pour metal into sprue cup 58. Conduit 60 connects cup 58 to a mold tree 62, shown in part, with an alloy reaction chamber 64 being formed on the lower side of conduit 62. As the metal passes over chamber 64, a reaction with the alloy held therein imparts the desired alloy content to the metal. In the conventional process thus described, it is highly desirable to know accurate metal volume flow at point A between cupola 20 and ladle 28; point B between ladle 28 and furnace 36; point C between furnace 36 and crane 42; point D between crane 42 and ladle 50; and point E between ladle 50 and cup 58.

Referring now to FIG. 2, a circuit of this invention is shown for determining metal volume flow. Transceiver antennas 72, 74 and 76 are equally arcuately spaced in a plane transverse to molten metal stream 80. Each antenna 72, 74, 76 directs a radiated wave 72A, 74A, 76A along a radial to a predetermined center 80A and receives a reflection 72B, 74B, 76B, respectively from the stream wall.

Antennas 72, 74, and 76 are electrically coupled to computer 84 wherein the time elapsed between transmitted and reflected waves is used to compute the instantaneous radii R1, R2, and R3, respectively and in turn the area of stream 80 may be closely and accurately determined by computer 84. It is to be understood that by increasing the number of transceiver antennas the area of stream 80 in the transverse plane may be more accurately determined. The stream 80 area is graphically displayed on an oscilloscope video readout 86 which is coupled to computer 84. Computer 84 is coupled to and provides stream area information to computer 88 which compares the change in stream area at predetermined short time intervals, such as seconds, and thus determines the "ripple" rate of stream 80. Since there is a known relationship between the ripple rate and stream velocity, stream 80 velocity may be determined by computer 88. Stream 80 volume is determined by computer 88 by multiplying stream area and stream velocity and stream volume is supplied on line 90 to servo process control 92. A programmed pour rate for each position, A to E, FIG. 1, is fed to control 92 by programmed pour rate circuit 94 and is compared with the actual pour volumes at one or more of points A to E respectively. Control 92 then provides a correction signal to each of the power members 26, 34, 40, 48, and 56, which signals are based on a correction difference between the programmed pour rate and the actual pour rate, to regulate the actual pour rate to agree with the programmed rate. Control 92 may also control pour heights and other pour control parameters. Computer 88 is coupled to and provides digital volume readout 95 with stream volume information for a digital readout to the operation of stream volume.

Control 92 is provided with a manual override 96 which provides a manually controlled override signal to control 92 in the event that there is a control malfunction or it is desired for a particular purpose to vary the programmed pour rate.

Control 92 is also provided with an input signal from automatic shut down control 98 which is provided with sensors 100 for indicating overflow or other danger conditions in any of the cupolas, furnaces, cranes, ladles, or molds. Control 98 provides a shut down signal to control 92 which will override any manual control or programmed control pouring rate. Control 92 provides signals to actuate power members 26, 34, 40, 48 and 56 according to the correction signals for pouring rates at locations A to E, respectively, in the schematic flow diagram of FIG. 1.

Referring now to FIG. 3, circuitry is schematically shown for one manner of implementing the functions of the circuit of FIG. 2. Only the circuitry for determining R2 from the radiated signal 74A and the reflection 74B from the wall of stream 80, transmitted and received by antenna 74 respectively, is shown but it is to be understood that each antenna has similar circuitry for determining its respective radius. Antenna 74 is coupled to transceiver 102 and directs a radiated beam towards center 80A and receives the reflection from the wall of stream 80. A trigger circuit 104 is coupled to transceiver 102 to initiate a radiation wave 74A from antenna 74. Also, trigger circuit 104 is coupled to a binary counter 106 and, simultaneously with each trigger signal to transceiver 102, starts a binary count in counter 106, which is provided with a clock signal from clock circuit 109. Trigger signals are generated at times T1, T2, ... TN, with the period between successive signals being greater than the maximum period between a radiated signal from antenna 74 and its reflection for all operating conditions.

Upon reception by antenna 74 of reflected wave 74B from the wall of stream 80, a signal is sent from transceiver 102 through connection 108 to stop the count in counter 106. The count from circuit 106 is transferred by connection 110 to R2 difference circuit 112 wherein the count is decremented from a predetermined count to provide a count representative of R2. In circuit 112, the distance corresponding to the count in counter 106 is subtracted from the distance between antenna 74 and center 80A, which is the inter section of the radials of the transceivers, to determine a distance R2 or the radius from center 80A to the wall of stream 80 at time T1. A delay circuit 116 is coupled between trigger circuit 104 and reset circuit 124 which delays each trigger signal by a period which is less than the period between successive trigger signals and more than the maximum period between a radiated signal and its reflection from stream 80 wall under all operating conditions. Reset generator 124 then generates a reset signal which is transferred through connection 126 to counter 106 resetting the count therein and preparing counter 106 for the next trigger signal at time T2 from trigger circuit 104.

Circuit 112 transfers the binary count representing the radius R2 at time T1 through connection 128 to compute area circuit 130, which also simultaneously receives a binary count corresponding to R1 through connection 132 from R1 circuit 134 and receives a binary count corresponding to R3 through connection 136 from R3 circuit 138. It is to be understood that the counts corresponding to R1 and R3 are generated in a similar manner to, and simultaneously with, the count generated for R2 for each trigger signal from circuit 104. Block 140, which is coupled to R1 circuit 134 by connection 142, is coupled to antenna 72 by connection 144, and box 146 which is coupled to R2 circuit 138 by connection 148 and to antenna 76 by connection 150. Boxes 140 and 146 represent schematically circuitry similar to that described for generating R2 count in box 151 for each of R1 and R3 counts respectively. It is to be understood that R1, R2, and R3 are generated simultaneously and fed to compute area circuit 130 simultaneously and that circuit 104 sends trigger signals simultaneously to each transceiver.

Upon receipt of the count signals representing R1, R2, and R3, compute area circuit 130 will average these signals, square the average, and multiply by a factor such as $\pi$ to obtain the area of stream 80. Other factors may be introduced, based on experience, to compensate for a non-circular stream area, to obtain a more accurate area measurement. Further, as mentioned, the more antennas and transceivers utilized, the more accurate is the area measurement.

Circuit 130 transfers a binary count, representing the stream area, by connection 152 to differentiator circuit 154 which compares the stream area signal at time T1 with the area signal at times T2, T3 ... TN to obtain the rate of change of area. The output of circuit 154 is transferred by connection 156 to velocity compute circuit 158 wherein the rate of area change is related to stream velocity since it is known that the "ripple rate" or rate in change of area velocity in a given transverse plane, is related to a corresponding stream velocity. This may be determined empirically for each particular composition in the stream 80. Thus, each ripple rate for a given stream substance has a corresponding velocity and circuit 158 matches each ripple rate with the predetermined corresponding velocity and provides at its output a velocity signal.

The output of circuit 130, which represents the stream area in the given transverse plane, is coupled by connection 160 to compute volume circuit 162 and the output of circuit 158, which represents the stream velocity is coupled by connection 164 to circuit 162. Multiplying the stream area and the stream velocity, the stream volume is computed and averaged over a short time period to provide an average volume flow and a binary count representing this quantity is transferred by connection 166 to digital display 168, to provide average volume flow representation for operator observation, and also coupled by way of connection 170 to servo process controller 172. A programmed pour rate circuit 174 provides a signal representative of a desired predetermined pour rate for a particular stage in a particular casting operation, through connection 176 to controller 172. Controller 172 compares the predetermined pour rate signal from circuit 174 to the actual pour rate signal from circuit 162 and provides a servo signal through connection 178 to pour mechanism 180. It is to be understood that pour mechanism 180 may provide signals to one or more of power members 26, 34, 40, 48 and 56. It is also to be understood that a separate set of transceivers, and associated processing equipment as shown in FIG. 3, may be placed at each of the stations A to E so that a separate pour mechanism control signal is supplied for each of the respective power members.

Serve process controller 172 is provided with an input by connection 182 from manual override circuit 184 which is manually operated and provides an override signal to the controller for operation of the pour mechanism controls 180 in the event that the operator desires to change the pour rate for a particular application or is aware of a danger condition requiring adjustment in pour rate. Also, controller 172 receives an input by way of connection 186 from an automatic shut down controller 188 which may be actuated by level sensors 190, or other sensing devices, indicating a dangerous condition and which will automatically generate a shut down signal which will override the signals to controller 172 from circuits 162 and 184, causing control 180 to move the respective pour control power member or members to a non-pour position.

Referring to FIG. 4, an alternate embodiment for determining a stream velocity will be described. A plurality of antennas which are similar to and arranged similarly to antennas 72, 74, and 76, is collectively shown schematically as array 200 and is positioned in a first transverse plane 202 and is coupled by connectors in line 204 to compute area circuit 206. The circuitry in 206 is equivalent to that shown included in the dashed box 206 of FIG. 3.

A second array of antennas, similar to antennas 72, 74, 76, FIG. 3, is shown schematically as array 208 which is arranged in a second transverse plane 210 which is spaced downstream a predetermined distance from plane 202. The antennas in array 208 are coupled to a compute area circuit 212 by connectors in line 214, the circuitry in box 212 being identical to that in box 206.

A clock 218 sends a clock signal to store register 220, which is also coupled to compute area circuit 206 by lead 222, and stores the stream 80 area in plane 202 at time T1. Clock 218 is also coupled to a clock register 224 by line 226. Compute area circuit 212 is coupled by line 228 to comparator 230 which receives an input from store register 220 through line 232, providing to comparator 230 the area in plane 202 at time T1. Comparator 230 then compares the area from circuit 212, which is the stream 80 area in plane 210, until the area information on line 228 matches or is identical to plane 202 area at time T1 and when a match is achieved, a stop signal is generated and coupled over line 234 to clock register 224 stopping the count in register 224. In this manner, register 224 records the time elapsed for a given stream 80 area to move from plane 202 to plane 210 which, on the stop signal, is transmitted by line 236 to compute velocity circuit 238. Since the distance between planes 202 and 210 is fixed and known and has been entered into circuit 238, the time elapsed for a given stream 80 area to move from plane 202 to plane 210 will determine stream velocity. As mentioned, stream velocity is proportional to the stream ripple and, while the stream area is constantly fluctuating in any given plane, a given area in the stream moves substantially unchanged downwardly in the stream at stream velocity.

Circuit 238 is coupled by line 240 to compute volume and pour control circuit 242, which also receives the area measurement from circuit 220 through line 244. Circuit 242 is equivalent to that shown, and operates in the manner similar to, the circuit in the dashed box 242 FIG. 3, to perform the functions of the circuitry previously described for FIG. 3. After each area match detected by comparator circuit 230, a signal is generated by circuit 230 and transmitted over line 246 to reset circuit 248 which sends a reset signal to clock 218, store register 220, and clock register 224 to clear each of these circuits and prepare them for a second velocity measurement. The planes 202 and 210 are sufficiently spaced apart so that the times between successive reset signals from reset 248 are greater than the time of delay 116.

Thus, in the operation in the circuit of FIG. 4, an instantaneous area in plane 202 of stream 80 is computed by circuit 206 and stored in register 220 at time T1. the instantaneous stream 80 area in plane 210 is computed by circuit 212 and coupled to comparator 230 which compares the plane 210 area with the plane 202 area until the areas match, at which time a stop signal is sent to clock register 224 which has been started by clock 218 upon receiving a reset signal from reset 248. After each match by comparator 230, a signal is sent to reset 248 which resets the circuit to start a new velocity compute cycle. The time in register 224 is sent to compute velocity 238 where the stream 80 velocity is computed and this is transmitted to circuit 242 which also receives the stream area information from register 220 to complete the compute volume and pour control functions.

While there have been described above the principles of this invention in connection with specific apparatus, it is to be clearly understood that this description is made only by way of example and not as a limitation to the scope of the invention.

What is claimed is:

1. Apparatus for measuring liquid flow in a stream comprising:
   radiation means for emitting a plurality of arcuately spaced radiation waves in a plane transverse to said stream, said waves being reflected from the stream walls in said plane;
   receiving means being positioned in said transverse plane for receiving the radiated waves reflected from said stream walls;
   measuring means coupled to each of said radiation means and reflection means for measuring the time elapsed between the instant of emission of each radiation wave and the instant of reception of the respective reflection of said each radiated wave;
   first computing means coupled to said measuring means for computing the area of said stream in said transverse plane;
   second computing means coupled to said first computing means for computing the rate of change of the area in said transverse plane;
   third computing means coupled to said second computing means for computing the velocity of said stream;
   fourth computing means coupled to said first and third computing means for computing the volume of said stream.

2. Apparatus of claim 1 wherein said radiation means comprises means for emitting along each of at least three equally spaced radii a radiation wave in said transverse plane.

3. Apparatus of claim 1 including pouring means for pouring said liquid; pouring control means coupled between said pouring means and said fourth computing means for variably controlling stream volume in a predetermined flow volume pattern.

4. Apparatus of claim 3 including manually operable means coupled to said pouring control means for overriding the operation of said control means.

5. Apparatus of claim 3 including an automatically operable means coupled to said control means for automatically overriding the operation of said control means upon a predetermined sensed condition.

6. Apparatus of claim 3 wherein said pouring control means includes programmed means for providing a programmed pour rate signal and for comparing the programmed pour rate with the stream volume to provide a difference signal to control said pouring means to obtain a stream volume consonant with said programmed pour rate.

7. Apparatus for measuring liquid flow in a stream comprising:
   first radiation means for emitting a plurality of arcuately spaced radiation waves in a first plane transverse to said stream, said waves being reflected from the stream walls in said plane;
   first receiving means being positioned in said first plane for receiving the radiated waves reflected from said stream walls;
   second radiation means for emitting a plurality of arcuately spaced radiation waves in a second plane substantially parallel to and spaced downstream from said first plane, said second waves being reflected from the stream walls in said second plane;
   second receiving means being positioned in said second plane for receiving the second radiated waves reflected from said stream wall;
   measuring means coupled to each of said first and second radiation means and first and second reflection means for measuring the time elapsed between the instant of emission of each first radiation wave and the instant of reception of the respective reflection of said each radiated wave and for measuring the time elapsed between the instant of emission of each second radiation wave and the instant of reception of the respective reflection of said each second radiated wave;
   first computing means coupled to said measuring means for computing the area of said stream in each of said first and second planes;
   second computing means coupled to said first computing means for measuring the time elapsed for a first stream area to move between said first and second planes to determine stream velocity;
   third computing means coupled to said measuring means and said first and second computing means for computing the volume of said stream.

8. Apparatus for measuring liquid flow in a stream comprising:
   first radiation means for emitting a plurality of arcuately spaced radiation waves in a plane transverse to said stream, said waves being reflected from the stream walls in said plane;
   first receiving means being positioned in said plane for receiving the radiated waves reflected from said stream walls;
   measuring means coupled to said radiation means and said reflection means for measuring the time elapsed between the instant of emission of each radiation wave and the instant of reception of the respective reflection of said each radiated wave;
   first computing means coupled to said measuring means for computing the area of said stream in said plane;
   second computing means coupled to said first computing means for determining the stream velocity; and
   third computing means coupled to said first computing means and said second computing means for computing the volume of said stream.

9. A method for measuring liquid flow in a stream comprising the steps of:
   directing a plurality of radiation waves from positions which are arcuately spaced from one another in a plane transverse to the stream, said waves being reflected from the stream wall in said plane;
   receiving the radiated waves reflected from the stream wall;
   measuring the time elapsed between the emission of each radiation wave and the instant of reception of the respective reflection of said each radiated wave;
   computing the area of the stream in the transverse plane of radiation emission;
   computing the stream velocity from the previously computed stream area; and
   computing the volume of the stream flow from the stream area and velocity.

10. The method of claim 9 wherein the step of computing the stream velocity comprises the steps of computing the rate of area change in said transverse plane and relating a given area rate of change to a corresponding stream velocity.

11. The method of claim 9 wherein the step of computing the stream velocity comprises computing the stream area in a second transverse plane downstream from the first mentioned transverse plane;
   comparing the areas computed in said first mentioned and second transverse planes to detect an area match;
   computing the time elapsed for a given stream area in the first mentioned transverse plane to arrive at the second transverse plane; and
   computing the stream velocity by relating said time elapsed with the distance between said transverse planes.

* * * * *